(No Model.)

H. B. CAMP.
COUPLING FOR STONEWARE PIPES.

No. 413,170. Patented Oct. 22, 1889.

Witnesses
C. E. Hamphrey
F. H. Stuart

Inventor
Horace B. Camp

By his Attorney
C. P. Humphrey

UNITED STATES PATENT OFFICE.

HORACE B. CAMP, OF CUYAHOGA FALLS, OHIO.

COUPLING FOR STONEWARE PIPES.

SPECIFICATION forming part of Letters Patent No. 413,170, dated October 22, 1889.

Application filed May 27, 1889. Serial No. 312,251. (No model.)

*To all whom it may concern:*

Be it known that I, HORACE B. CAMP, a citizen of the United States, residing at Cuyahoga Falls, in the county of Summit and State of Ohio, have invented a certain new and useful Coupling for Stoneware Pipes, of which the following is a specification.

My invention has relation to improvements in couplings for underground pipes for conducting fluids and gases or to constitute cases for electrical wires and cables, and has especial relation to connecting sections of stoneware pipe.

The objects of my invention are, first, to provide a coupling which shall be flexible when applied, so as to adjust itself to the irregularities of the pipe as it lies in the ground; second, to maintain the coupling in a semi-flexible condition after it is applied, so that slight variations of the angle of the pipes, due to unequal settling of the earth, will not cause leakage, and, third, to protect the inner parts of the coupling from corrosion or decay from acids or other chemicals that may exist in the earth that surrounds the pipe.

To this end my invention consists in the peculiar combination and application of parts hereinafter described and explained, and specifically pointed out in the claims, reference being had to the accompanying drawings, which constitute a part of this application.

Figure 1:
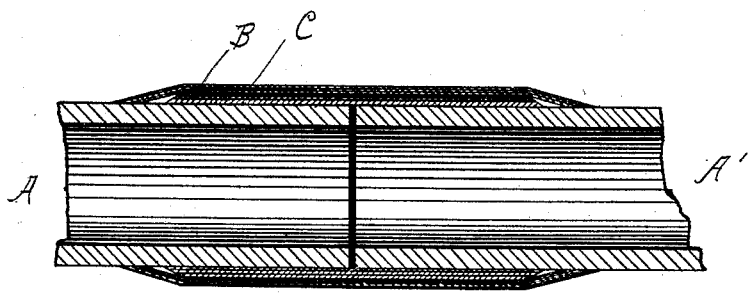
Figure 2:
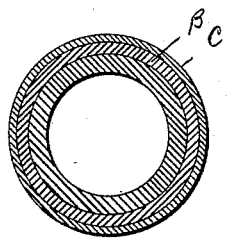

In the accompanying drawings, in which similar letters of reference indicate like parts, Figure 1 is a central vertical longitudinal section of portions of two stoneware pipes united with my improved coupling, and Fig. 2 a vertical transverse section of the same at the point of union.

A A' represent, respectively, adjacent ends of two sections of stoneware pipe, preferably vitrified sewer-pipe, and placed contiguous to each other. About and covering the ends of both pipes is wrapped, in a series of layers B, a band of woven fabric, preferably burlaps, which has been saturated with an elastic material, as asphaltum or coal-tar, and is applied while the material is heated, whereby a close union is made with the ends of the pipe and with the several layers of the fabric. The flexible character of a coupling thus formed permits it to adapt itself to angles at the joints of the pipe, and also allows it to yield to uneven pressure in the settling of the earth about the pipe. To prevent corrosion of the fabric or material with which it is saturated from acids or other chemicals that may be contained in the earth, I cover the coupling thus made with a strip C, of substantially the same fabric, in a series of layers coated with a solution of Portland or other cement which will resist the entrance of water, acids, or gases, and which projects in each direction beyond the first strip and unites with the pipes in each direction.

I am aware that a strip of woven fabric saturated with asphaltum and wrapped about the ends of the pipe to form a coupling is not new, and such I do not claim; but

What I claim, and desire to secure by Letters Patent, is—

In a pipe-coupling, the combination of a strip of fabric saturated with asphaltum and wrapped about the adjacent ends of the pipe-sections with a strip of like material saturated with a solution of water-lime cement wrapped about the inner strip and extending beyond it and uniting with the pipe in each direction, substantially as shown and described, and for the purpose specified.

In testimony that I claim the above I hereunto set my hand.

HORACE B. CAMP.

In presence of—
C. P. HUMPHREY,
C. E. HUMPHREY.